United States Patent
Chundrlik, Jr. et al.

(10) Patent No.: US 10,343,486 B2
(45) Date of Patent: Jul. 9, 2019

(54) VEHICLE VISION SYSTEM WITH ENHANCED FUNCTIONALITY

(71) Applicant: MAGNA ELECTRONICS INC., Auburn Hills, MI (US)

(72) Inventors: William J. Chundrlik, Jr., Rochester Hills, MI (US); Axel Nix, Birmingham, MI (US); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/911,446

(22) Filed: Mar. 5, 2018

(65) Prior Publication Data
US 2018/0186214 A1  Jul. 5, 2018

Related U.S. Application Data

(63) Continuation of application No. 15/361,747, filed on Nov. 28, 2016, now Pat. No. 9,908,385, which is a
(Continued)

(51) Int. Cl.
| | |
|---|---|
| *B60H 1/00* | (2006.01) |
| *H04N 7/18* | (2006.01) |
| *G08G 1/16* | (2006.01) |
| *G06K 9/00* | (2006.01) |
| *B60J 1/12* | (2006.01) |
| *B60R 1/04* | (2006.01) |
| *B60R 1/12* | (2006.01) |

(52) U.S. Cl.
CPC ............ *B60H 1/00771* (2013.01); *B60J 1/12* (2013.01); *B60R 1/04* (2013.01); *B60R 1/12* (2013.01); *G06K 9/00791* (2013.01); *G06K 9/00805* (2013.01); *G06K 9/00818* (2013.01); *G08G 1/166* (2013.01); *H04N 7/181* (2013.01); *B60R 2001/1215* (2013.01); *B60R 2300/8086* (2013.01)

(58) Field of Classification Search
CPC .......... B60H 1/00771; B60J 1/12; B60R 1/04; B60R 1/12; G06K 9/00791; G06K 9/00805; G06K 9/00818; G08G 1/166; H04N 7/181
USPC ....................................................... 340/425.5
See application file for complete search history.

(56) References Cited

U.S. PATENT DOCUMENTS

| | | |
|---|---|---|
| 4,241,870 A | 12/1980 | Marcus |
| 4,247,850 A | 1/1981 | Marcus |

(Continued)

*Primary Examiner* — Kerri L McNally
(74) *Attorney, Agent, or Firm* — Honigman LLP

(57) ABSTRACT

A vision system for a vehicle includes a camera disposed at a vehicle equipped with said vision system, the camera having a field of view at least forward of the equipped vehicle. A control includes an image processor for processing image data captured by the camera. The control, via processing by the image processor of image data captured by the camera, determines position of the sun relative to a driver's forward view through the windshield. Responsive to determining, via processing by the image processor of image data captured by the camera, that the position of the sun is likely to hinder the driver's forward view through the windshield, the control controls a sun visor of the equipped vehicle to limit sunlight from reaching the driver's eyes.

19 Claims, 9 Drawing Sheets

Related U.S. Application Data continuation of application No. 15/042,665, filed on Feb. 12, 2016, now Pat. No. 9,509,962, which is a continuation of application No. 13/681,963, filed on Nov. 20, 2012, now Pat. No. 9,264,673.

(60) Provisional application No. 61/561,875, filed on Nov. 20, 2011.

(56) References Cited

U.S. PATENT DOCUMENTS

| | | |
|---|---|---|
| 4,595,228 A | 6/1986 | Chu |
| 4,874,938 A * | 10/1989 | Chuang ................. B60J 3/0208 250/203.4 |
| 5,184,132 A | 2/1993 | Baird |
| 5,479,155 A | 12/1995 | Zeinstra et al. |
| 5,522,638 A | 6/1996 | Falcoff et al. |
| 5,550,677 A | 8/1996 | Schofield et al. |
| 5,619,190 A | 4/1997 | Duckworth et al. |
| 5,627,529 A | 5/1997 | Duckworth et al. |
| 5,661,455 A | 8/1997 | Van Lente et al. |
| 5,670,935 A | 9/1997 | Schofield et al. |
| 5,680,263 A | 10/1997 | Zimmermann et al. |
| 5,714,751 A * | 2/1998 | Chen ........................ B60J 3/04 250/203.4 |
| 5,760,962 A | 6/1998 | Schofield |
| 5,786,772 A | 7/1998 | Schofield et al. |
| 5,796,094 A | 8/1998 | Schofield et al. |
| 5,798,688 A | 8/1998 | Schofield |
| 5,877,897 A | 3/1999 | Schofield et al. |
| 5,887,929 A | 3/1999 | Miller et al. |
| 5,929,786 A | 7/1999 | Schofield et al. |
| 6,078,271 A | 6/2000 | Roddy et al. |
| 6,091,330 A | 7/2000 | Swan et al. |
| 6,126,221 A | 10/2000 | Kern |
| 6,135,528 A | 10/2000 | Sobieski et al. |
| 6,201,642 B1 | 3/2001 | Bos et al. |
| 6,222,447 B1 | 4/2001 | Schofield et al. |
| 6,302,545 B1 | 10/2001 | Schofield et al. |
| 6,333,698 B1 | 12/2001 | Roddy |
| 6,362,771 B1 | 3/2002 | Schofield et al. |
| 6,396,397 B1 | 5/2002 | Bos et al. |
| 6,396,408 B2 | 5/2002 | Drummond et al. |
| 6,498,620 B2 | 12/2002 | Schofield et al. |
| 6,523,964 B2 | 2/2003 | Schofield et al. |
| 6,525,645 B2 | 2/2003 | King et al. |
| 6,556,681 B2 | 4/2003 | King |
| 6,611,202 B2 | 8/2003 | Schofield et al. |
| 6,636,258 B2 | 10/2003 | Strumolo |
| 6,690,268 B2 | 2/2004 | Schofield et al. |
| 6,757,109 B2 | 6/2004 | Bos et al. |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield et al. |
| 6,891,563 B2 | 5/2005 | Schofield et al. |
| 6,946,978 B2 | 9/2005 | Schofield et al. |
| 7,005,974 B2 | 2/2006 | McMahon et al. |
| 7,023,322 B2 | 4/2006 | Baumgardner et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,232,176 B1 * | 6/2007 | Dopwell ................. B60J 3/0204 160/23.1 |
| 7,248,283 B2 | 7/2007 | Takagi et al. |
| 7,295,229 B2 | 11/2007 | Kumata et al. |
| 7,301,466 B2 | 11/2007 | Asai |
| 7,461,887 B1 * | 12/2008 | Federle ................. B60J 3/0234 296/97.4 |
| 7,568,751 B2 * | 8/2009 | Suzuki ................. B60J 3/0204 296/97.5 |
| 7,592,928 B2 | 9/2009 | Chinomi |
| 7,720,580 B2 | 5/2010 | Higgins-Luthman |
| 7,859,565 B2 | 12/2010 | Schofield et al. |
| 7,881,496 B2 | 2/2011 | Camilleri et al. |
| 7,970,172 B1 * | 6/2011 | Hendrickson ............. B60J 3/04 280/735 |
| 8,162,376 B1 * | 4/2012 | Grossmith ............. B60J 3/0243 296/97.11 |
| 9,041,806 B2 | 5/2015 | Baur et al. |
| 9,264,673 B2 | 2/2016 | Chundrlik, Jr. et al. |
| 9,509,962 B2 | 11/2016 | Chundrlik, Jr. et al. |
| 9,908,385 B2 | 3/2018 | Chundrlik, Jr. et al. |
| 2002/0128774 A1 | 9/2002 | Takezaki |
| 2003/0112121 A1 | 6/2003 | Wilson |
| 2005/0190952 A1 | 9/2005 | Nagasawa |
| 2006/0140502 A1 * | 6/2006 | Tseng ........................ B60J 3/04 382/275 |
| 2008/0042812 A1 | 2/2008 | Dunsmoir |
| 2008/0130954 A1 | 6/2008 | Taniguchi |
| 2010/0045449 A1 | 2/2010 | Stein |
| 2010/0094501 A1 * | 4/2010 | Kwok ................. G02B 27/01 701/36 |
| 2010/0171588 A1 | 7/2010 | Chutorash et al. |
| 2011/0210868 A1 | 9/2011 | Yano et al. |
| 2012/0062743 A1 | 3/2012 | Lynam et al. |
| 2012/0130775 A1 | 5/2012 | Bogaard et al. |
| 2012/0148092 A1 | 6/2012 | Ni |
| 2013/0002873 A1 | 1/2013 | Hess |
| 2013/0046441 A1 | 2/2013 | Marczok et al. |
| 2013/0099908 A1 | 4/2013 | Salomonsson |
| 2013/0116859 A1 | 5/2013 | Ihlenburg |
| 2014/0152778 A1 | 6/2014 | Ihlenburg |
| 2014/0184799 A1 | 7/2014 | Kussel et al. |
| 2014/0218535 A1 | 8/2014 | Ihlenburg |
| 2014/0232872 A1 | 8/2014 | Kussel |
| 2014/0293057 A1 | 10/2014 | Wierich |
| 2014/0298642 A1 | 10/2014 | Sesti et al. |
| 2014/0307095 A1 | 10/2014 | Wierich |
| 2014/0320658 A1 | 10/2014 | Pliefke |
| 2015/0049193 A1 | 2/2015 | Gupta |

* cited by examiner

VEHICLE VISION SYSTEM WITH ENHANCED FUNCTIONALITY

CROSS REFERENCE TO RELATED APPLICATIONS

The present application is a continuation of U.S. patent application Ser. No. 15/361,747, filed Nov. 28, 2016, now U.S. Pat. No. 9,908,385, which is a continuation of U.S. patent application Ser. No. 15/042,665, filed Feb. 12, 2016, now U.S. Pat. No. 9,509,962, which is a continuation of U.S. patent application Ser. No. 13/681,963, filed Nov. 20, 2012, now U.S. Pat. No. 9,264,673, which claims the filing benefits of U.S. provisional application Ser. No. 61/561,875, filed Nov. 20, 2011, which is hereby incorporated herein by reference in its entirety.

FIELD OF THE INVENTION

The present invention relates to vehicles with cameras mounted thereon and in particular to vehicles with front-facing cameras.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system that is operable to capture image data representative of a scene exterior of the vehicle (such as forwardly and/or sidewardly relative to the vehicle's direction of forward travel) and, responsive to image processing of the captured image data by an image processor, the system is operable to provide one or more functions and/or to control one or more accessories of the vehicle and/or to provide one or more alerts or communications, such as for the driver of the vehicle or such as for people or pedestrians exterior of the vehicle.

These and other objects, advantages, purposes and features of the present invention will become apparent upon review of the following specification in conjunction with the drawings.

DETAILED DESCRIPTION OF THE INVENTION

Figure 1:
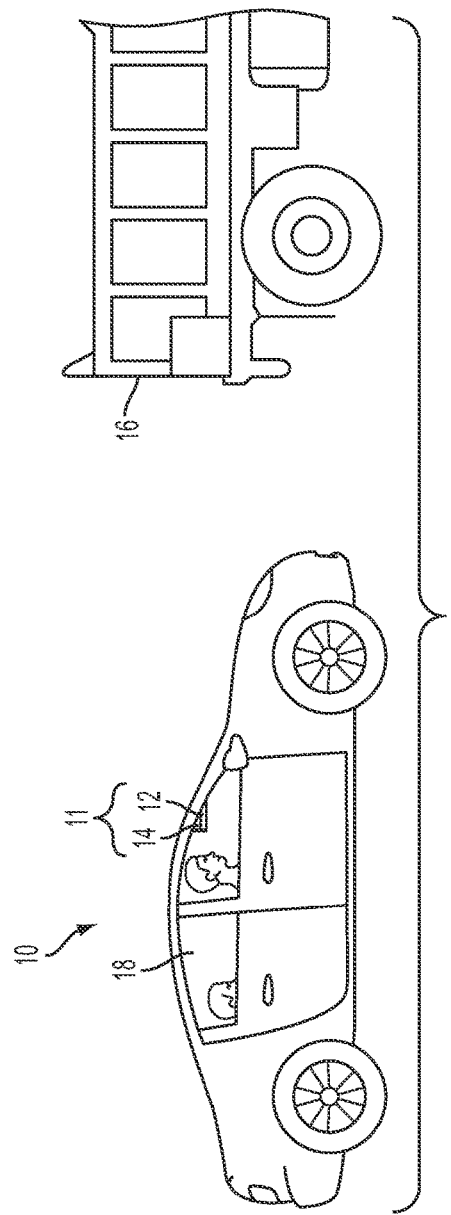
FIG. 1 is a side elevation of a vehicle equipped with a vision system in accordance with the present invention, shown with a truck on the road ahead of the equipped vehicle.

Referring now to the drawings and the illustrative embodiments depicted therein, a vehicle 10 has a camera system 11 which includes, among other things a front-facing camera 12 and a control system 14 in accordance with an embodiment of the present invention. The front-facing camera 12 may comprise any suitable type of front-facing camera or imaging sensor or the like. The control system 14 may comprise any suitable type of control system.

In one embodiment, the control system 14 includes programming to detect the presence of a truck, such as shown at 16 in FIG. 1, in front of the vehicle 10. This may be accomplished in any number of suitable ways. For example, the control system 14 may be programmed to look for a particular shape (such as, for example, a rectangular shape) within a selected region in the images received by the camera's imager, which would be indicative of a truck 16. The selected region of the image will depend of course on the position of the camera 12 at the vehicle 10, but may optionally also depend on such characteristics such as the distance from the vehicle 10 to the truck 16, which may be determined using information from an optionally provided front sensor system, such as a radar system or lidar system or ultrasonic system or stereoscopic imaging system or the like.

Upon detection of a truck in front of the vehicle 10, the control system 14 may be programmed to take some action. For example, the control system 14 may be programmed to put the heating/ventilation/air conditioning (HVAC) system into a recirculation or 'Recirc' mode, wherein most or all of the air sent to the cabin (the cabin is shown at 18) is not fresh air from outside the vehicle, but is recirculated from the cabin 18 itself. An advantage to this would be that potentially noxious exhaust from the truck 16 would not be drawn into the vehicle cabin 18. When the vehicle 10 is no longer behind the truck 16, the control system 14 may return the HVAC system to whatever air flow setting it had prior to determining there was a truck 16 in front of the vehicle 10. Optionally, the control system 14 may be programmed to only put the HVAC system into the air recirculation mode when it determines that the vehicle 10 is within a selected distance from the truck 16. In addition to or alternatively to putting the HVAC system in the air recirculation mode, the control system 14 may be programmed to, responsive to detection of a truck ahead of the vehicle and optionally with the truck determined to be within a threshold distance to the vehicle, close the windows of the vehicle 10 if they are open.

Figure 2:
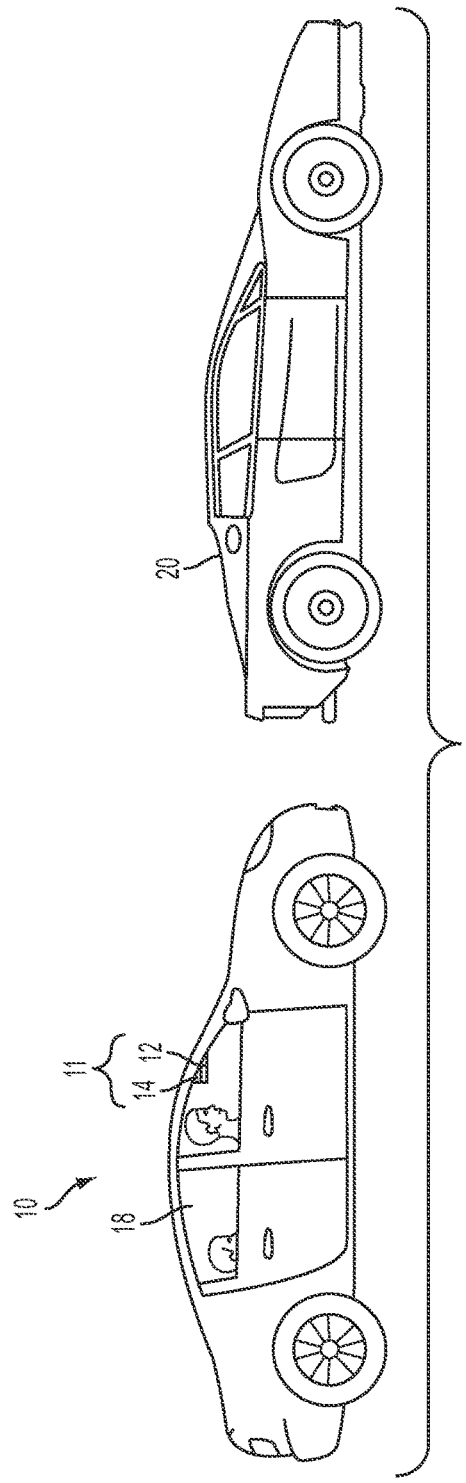
FIG. 2 is a side elevation of a vehicle equipped with a vision system in accordance with the present invention, shown with a car on the road ahead of the equipped vehicle.

Referring to FIG. 2, the present invention may comprise a control system 14 that is programmed to also determine whether the subject or equipped vehicle 10 is behind another vehicle or car 20. If the control system determines that the vehicle 10 is behind a car 20, it may also take action by putting the HVAC system into an air recirculation or 'Recirc' mode if vehicle 10 is within a selected distance from the car 20 in front of it. The selected or threshold distance between the vehicle 10 and the truck 16 (FIG. 1) may be larger than the selected distance to the selected distance between the vehicle 10 and the car 20 (FIG. 2).

Figure 3:
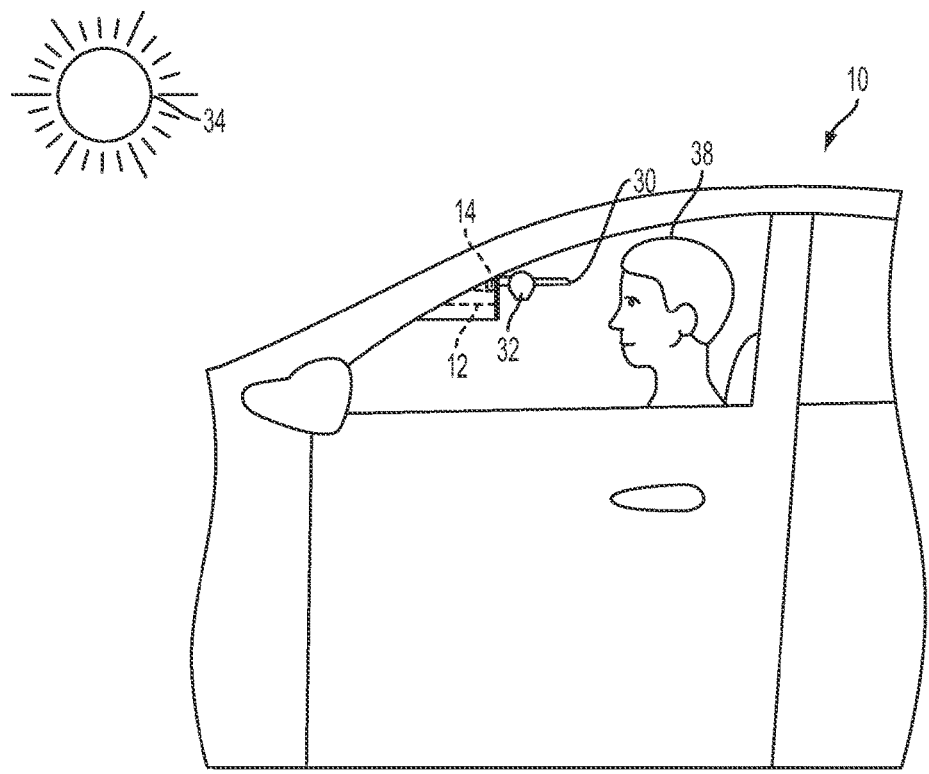
FIG. 3 is a side elevation of a vehicle equipped with a vision system in accordance with the present invention, shown with a sun visor in the equipped vehicle that is operable responsive to the vision system.

Reference is made to FIG. 3, which shows another embodiment of the present invention. The vehicle 10 in this embodiment has a sun visor 30 that has an actuator 32 mounted thereat. The actuator 32 may comprise any suitable type of actuator, such as a stepper motor, a rotary solenoid, a linear solenoid with a gear linkage to convert its motion to rotary motion, a spring loaded linkage with a solenoid-actuated retractable locking member to hold the spring loaded linkage in a spring-loaded state, or any other suitable type of actuator. The control system 14 in this embodiment can be used to detect the position of the sun (shown at 34 in FIG. 3) in images captured by the camera 12. The control system 14, upon determining the position of the sun 34 in the images, can determine whether the sun 34 is likely to be hindering the driver's view of the road (such as by determining an intensity of ambient light at the vehicle and/or the angle of the sun relative to the ground and relative to the direction of travel of the vehicle). If the control system determines that the sunlight may be likely hindering the driver's view, the control system 14 may be programmed to automatically lower the sun visor 30 (such as to move the sun visor 30 from a stowage or flipped up position to a use or lowered position) responsive to such a determination. Optionally, the sun visor 30 may be returned back to its stowage or raised position by the control system 14 upon determining that it is no longer needed (such as upon determining that the sun 34 is no longer hindering the driver's view and/or upon determining that the use of or lowering of the sun visor 30 will not be of much or any help, such as if it is determined that the sun 34 is too low in the sky for the sun visor, when lowered, to block the sunlight from the driver's eyes).

The control system 14 may determine the sun's position in the images by scanning the images for brightness levels beyond a certain value, for example, and possibly for a certain color or range of colors that would be indicative of sunlight from the sun 34. The position of the head of the driver (shown at 38) of the vehicle is going to be in a relatively fixed area relative to the camera 12. Thus, there is a relatively fixed range of positions of the sun 34 in the images captured by the camera 12 that would indicate that the sun 34 (or direct illumination from the sun) is in the eyes of the driver and that the driver's view may be helped by deployment of the sun visor 30. Thus, the control system 14 may be programmed to immediately deploy the sun visor 30 as soon as it detects that the sun 34 is within that fixed range of positions in the images. In this embodiment, the term sun visor 34 is intended to be interpreted broadly and may include any type of technology for protecting the driver's eyes from the sun 34 (and may include mechanically or electro-mechanically adjustable sun visors and/or electrically controlled shade devices or shading or darkening devices, such as electro-optic windows or the like or such as windows with shades therein or the like).

Figure 4:
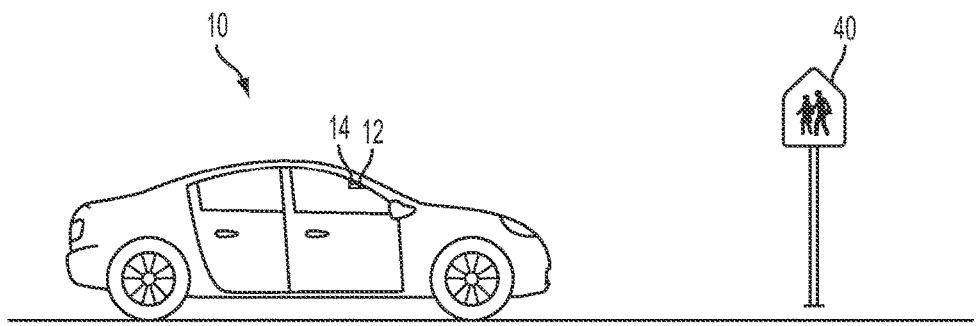
FIG. 4 is a side elevation of a vehicle equipped with a vision system in accordance with the present invention, shown with the vehicle approaching a school sign.

Reference is made to FIG. 4 which shows the camera 12 and control system 14 in accordance with another embodiment of the present invention. In the embodiment shown in FIG. 4, the control system 14 is programmed to detect certain traffic related signs, such as, for example, the school zone sign shown at 40. The control system 14 may possess several pre-stored views of school zone signs in its memory. Such views may include views of several different types of school zone sign, and may include images of each type of school zone sign from several different angles. The control system 14 may be programmed to scan images or portions of images for shapes that match the shape of a school zone sign. The portions of the image within the detected shape would then optionally be adjusted for such factors as size (indicative of distance of the sign from the vehicle 10) and ambient light to match the size and ambient light of the school zone sign images stored in memory. The control system 14 may then compare these adjusted portions of the image to the school zone sign images stored in memory to determine if any of these adjusted portions of the image represent a school zone sign.

If the control system 14 determines that a school zone sign is present in the camera's field of view, the control system 14 may take a suitable action, which may be, for example, to mute the vehicle's stereo system so as to permit the driver to be more attuned to the presence of any children nearby that might be at risk of collision from the vehicle 10. Another action taken by the control system 14 upon detection of a school zone sign is to shift a pedestrian detection system into a high-sensitivity mode. The pedestrian detection system may also utilize the camera 12 and control system 14. For example, the pedestrian detection system may include suitable code stored by the control system 14 to detect certain shapes in images captured by the camera 12 that correspond to pedestrians of different sizes (from small children to adults) and shapes (underweight to overweight, to carrying backpacks, umbrellas or other paraphernalia) carrying out certain common activities such as walking, bending, sitting, standing, lying down (for example, if they are injured), riding a bicycle, riding a tricycle, riding a scooter, or other shapes.

In a regular sensitivity mode, when the control system 14 compares the detected elements in images captured by the camera 12 with stored images of pedestrians in its memory, the control system 14 may require a certain exactness of a match for it to conclude that a pedestrian is present in the camera image. The level of exactness that is required impacts the numbers of false positives (situations where the control system 14 determines that there is a pedestrian in the camera image but in reality there is no pedestrian in the image) and false negatives (situations where the control system does not find a pedestrian that actually is in the camera image) that will be generated by the control system 14. Upon switching a high-sensitivity mode, the pedestrian detection system may reduce the level of exactness that is required, thereby potentially increasing the number of false positives, but also potentially decreasing the number of false negatives. Optionally, the control system 14 may be configured to also be capable of detecting signs that indicate that a playground is nearby, or signs that indicate that children may be playing. Additionally, or alternatively, the control system 14 may be programmed to receive input from a navigation system on the vehicle 10 that would indicate when the vehicle 10 is coming upon a school zone or a playground or the like. By using the camera images to detect traffic signs and the like in combination with using the navigation system, the control system 14 may be capable of achieving a higher rate of detecting when the vehicle 10 is in the vicinity of children that the driver should watch out for.

Figure 5:
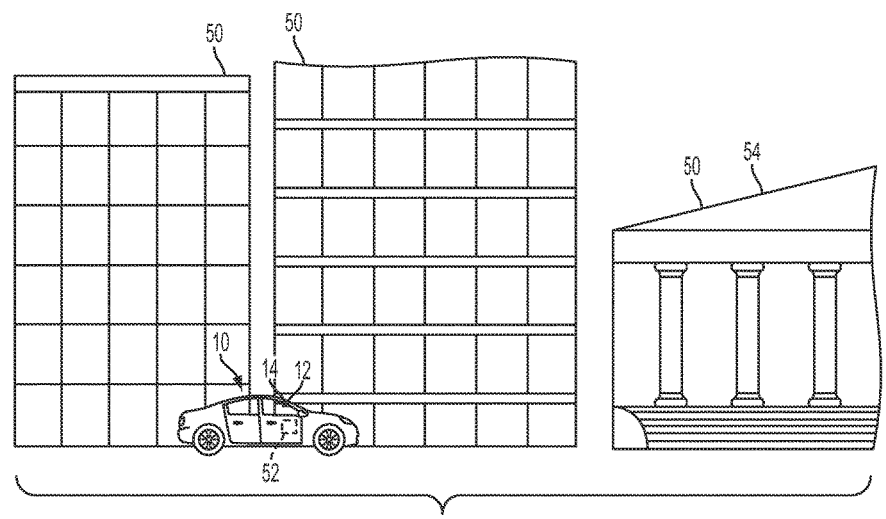
FIG. 5 is a side elevation of a vehicle equipped with a vision system in accordance with the present invention, shown with the vehicle approaching a landmark building.

Reference is now made to FIG. 5. When the vehicle 10 is being driven, it is possible that the vehicle 10 will be in an area where its access to signals from GPS satellites will be poor. This is true for example, in the downtown core of some cities, where the buildings (shown at 50) can hinder a vehicle's ability to receive GPS signals. As a way of enhancing the performance of the navigation system (shown at 52), the control system 14 can be programmed to recognize certain landmarks (an example of which may be stored at 54), which it may contain images of stored in its memory. For example, the control system 14 can be programmed to detect the presence of a particular hotel, museum, office building, statue or other landmark. Preferably, the control system 14 can access a memory containing images of many different landmarks in places where there is a higher likelihood of losing a GPS signal. Upon detection in the camera images of one of the landmarks stored in memory, the control system 14 may notify the navigation system 52 that the vehicle 10 has just arrived at that landmark, and the navigation system 52 may then use that information to update itself as to the position of the vehicle 10 in its stored map. The navigation system 52 may then use other data such as the speed and heading of the vehicle 10 to estimate the current position of the vehicle 10 until the control system 14 detects another landmark, as which point the navigation system 52 may update itself again as to the vehicle's actual position. This may also be applicable when the vehicle is underground, such as in underground parking garages.

Figure 6:
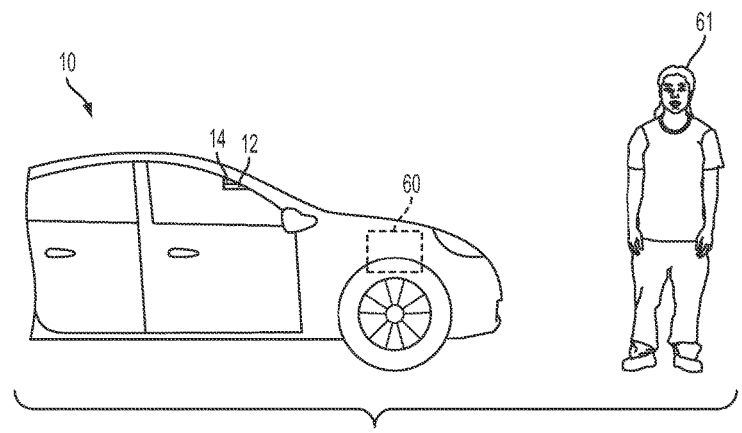
FIG. 6 is a side elevation of a vehicle equipped with a vision system in accordance with the present invention, shown with the vehicle approaching a pedestrian.

Referring to FIG. 6, the vehicle 10 may be a vehicle that has a traction battery 60 on board that is sometimes used to drive the vehicle with no assist from an internal combustion engine. In such cases, the vehicle 10 can sometimes be so quiet that it is not heard as it approaches pedestrians (shown at 61). Blind pedestrians in particular are at a disadvantage because they do not receive visual cues that a vehicle is approaching and they instead are heavily reliant on sound to detect oncoming traffic. In such instances, the vehicle 10 may have a pedestrian detection system (as described above, for example) and the control system 14 may be programmed to generate an audible noise upon detection of a pedestrian that is a potential collision risk. The audible noise may be generated by actuating the horn of the vehicle 10 or by some other means, such as sounding a buzzer or the like.

Figure 7:
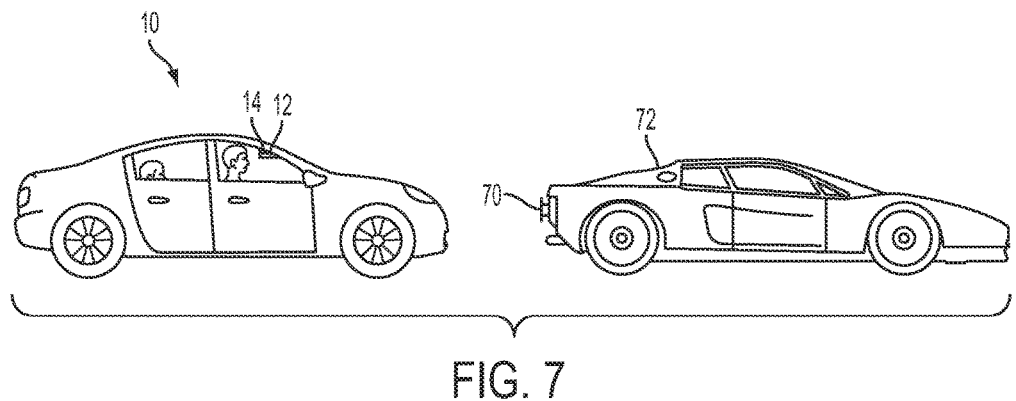
FIG. 7 is a side elevation of a vehicle equipped with a vision system in accordance with the present invention, shown with the equipped vehicle following another vehicle and operable to detect and read the license plate of the other vehicle.

Referring to FIG. 7, the control system 14 may be programmed to be able to read license plates (shown at 70) from camera images that contain images of other vehicles (shown at 72). This information can be useful, for example, to assist in the detection of vehicles that are known by police to have been used in a crime or that were stolen. For example, the control system 14 may contain memory that contains a list of vehicle license plate numbers that were received from a police database. When in the vicinity of other vehicles 72, the control system 14 may automatically detect and read their license plates 70 and may determine whether any of license plates 70 corresponds to anything in the control system's memory. Upon detection of a match, the control system 14 may optionally notify the driver so that the driver can notify the police. A license plate number that is made known to the vehicle driver (such as, for example, via an 'Amber' alert shown on an electronic traffic notification sign that appears on a highway on which the driver is driving) may be entered into the control system's memory manually by the driver, so that the control system 14 can then compare detected license plates 70 to that one stored in its memory and can notify the driver if it detects a match.

Figure 8:
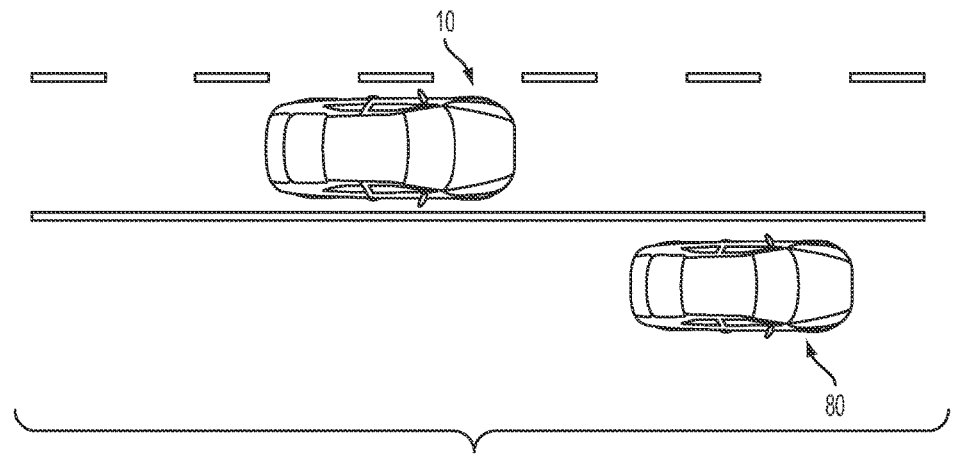
FIG. 8 is a plan view of a vehicle equipped with a vision system in accordance with the present invention, shown with the vehicle approaching another vehicle at the side of the road, whereby the vision system may determine if the other vehicle is abandoned.

Referring to FIG. 8, the control system 14 may be programmed to detect if a vehicle (shown at 80) is on the side of the road and is abandoned via detection of certain telltale indicators (such as, for example, detecting that no vehicle lights are on, detecting that no people are near the vehicle). In such an instance, the control system 14 may read the license plate number of the potentially abandoned vehicle 80 and may notify the driver of the vehicle 10 so that the driver can decide whether to notify the police.

Figure 9:
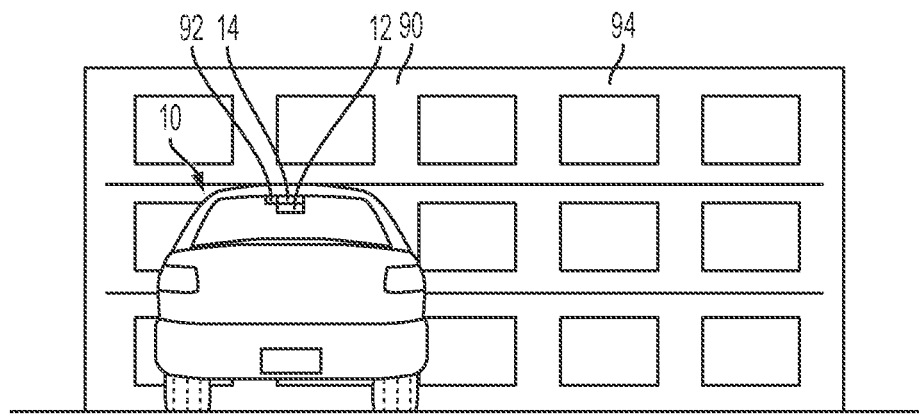
FIG. 9 is a rear elevation of a vehicle equipped with a vision system in accordance with the present invention, shown with the vehicle at a garage door.

In another embodiment shown in FIG. 9, the control system 14 may be programmed to detect the presence of a garage door (shown at 90) in the camera images. Upon detection of a garage door 90 in the images, the control system 14 may be programmed to automatically send a garage door open signal via a garage door opening system transmitter 92 that may be incorporated into the vehicle 10. As a result, if the garage door 90 is the one that belongs to the vehicle driver, it will open. In this way, a truly automatic garage door opening function is provided. Alternatively, it is possible for the control system 14 to specifically be capable of detecting the presence of the vehicle driver's garage door (shown at 94) in the camera images, in which case, the control system 14 may be programmed to send a signal in an attempt to open the door. Initially, images of the vehicle owner's garage door 94 may be captured by the vehicle camera 12 and stored in a memory that is accessed by the control system 14. Then when the control system 14 detects a garage door in images captured by the camera 12 it can compare them to the images stored in the memory to determine whether it is the owner's garage door 94, and can then actuate the transmitter 92 to open the garage door 94.

Figure 10:
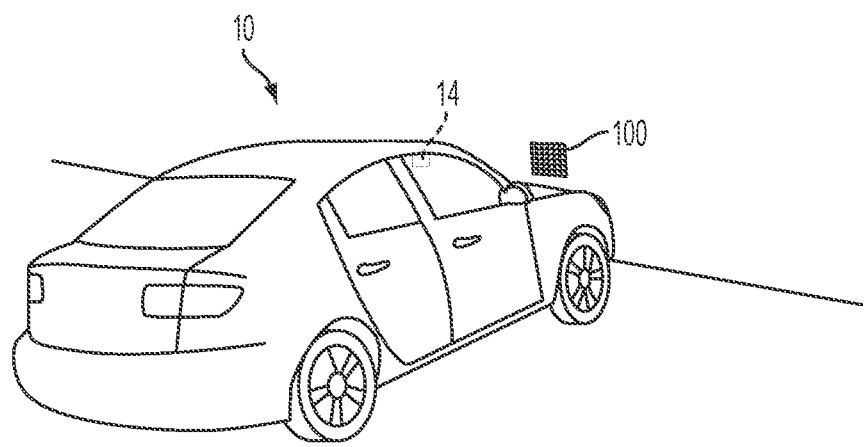
FIG. 10 is a side elevation of a vehicle equipped with a vision system in accordance with the present invention, shown with the vehicle approaching a barcode at a wall or structure, whereby the system may be operable to scan the barcode and control an accessory or the like responsive to the barcode.

In yet another embodiment shown in FIG. 10, the control system 14 may be programmed to detect indicia, such as barcodes (for example, two-dimensional barcodes) that may be positioned in selected places for the purpose of directing the actions of the control system 14. For example, a barcode 100 may be provided on a garage wall or on the garage floor in which the vehicle 10 is to be parked that instructs the control system 14 to carry out a certain action such as to close the garage door. When the vehicle 10 reaches a selected position where the barcode 100 is read by the camera 12, the control system 14 then carries out that action. In another example, when the vehicle 10 drives into a public parking garage, the detection of a first barcode may cause the control system 14 to start a clock that times how long the vehicle 10 is in the parking garage. Upon leaving the parking garage, detection of a second barcode may trigger an automatic payment of a parking fee via a wireless internet connection by the control system 14 using the driver's credit card number.

Figure 11:
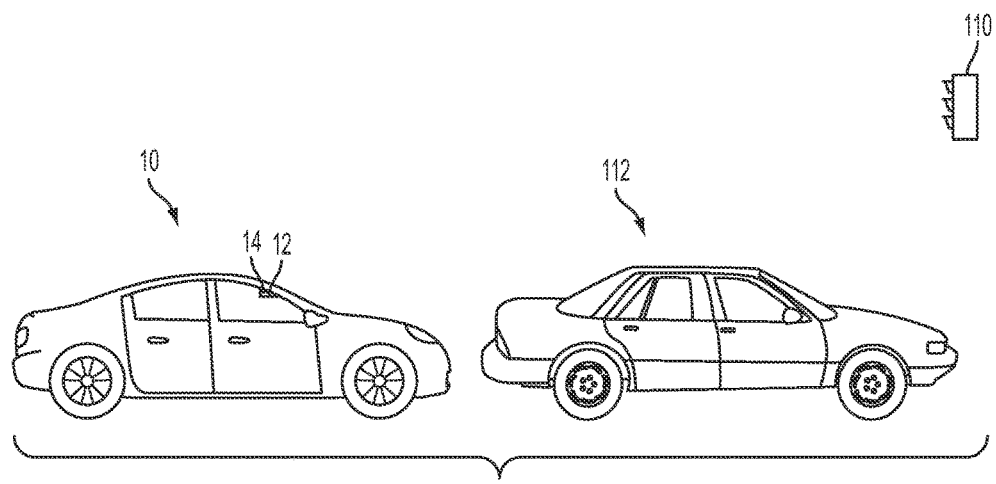
FIG. 11 is a side elevation of a vehicle equipped with a vision system in accordance with the present invention, shown with the equipped vehicle behind another vehicle at a traffic light.

Aside from detection of traffic signs and the like, the control system 14 may be programmed to detect traffic lights (an example of which is shown at 110 in FIG. 11). For example, when detecting that the traffic light 110 in front of the vehicle 10 is red, the control system 14 may be programmed to maintain braking when the driver lifts his/her foot off the brake pedal. In some instances the driver will want to go forward even if there is a red light (for example, to avoid an imminent collision from another vehicle). To permit the driver this freedom, the control system 14 can optionally be overridden by some indication such as by sufficient amount of depression of the accelerator pedal. In a similar scenario, the control system 14 may be programmed to detect the presence of other vehicles (an example of which is shown at 112) in front of the vehicle 10 and may be programmed to maintain braking on the vehicle 10 if there is a vehicle 112 that is very close in front of the vehicle 10 even if the driver of vehicle 10 lifts his/her foot off the brake pedal.

Figure 12:
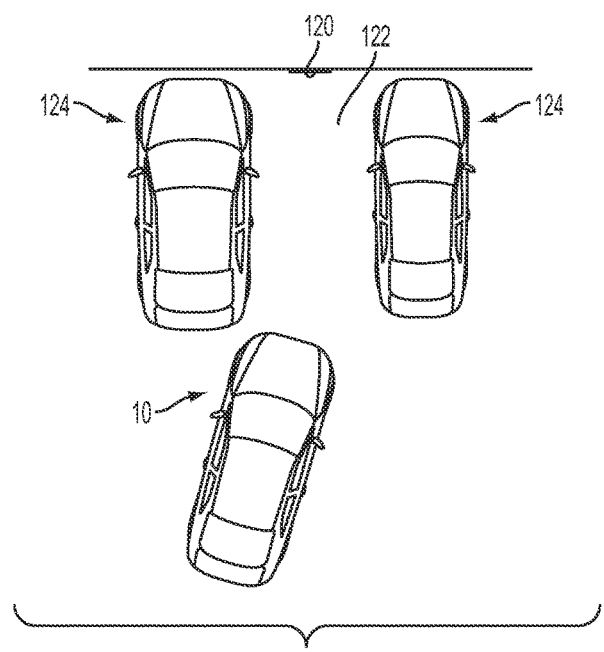
FIG. 12 is a plan view of a vehicle equipped with a vision system in accordance with the present invention, shown with the equipped vehicle at a parking space between two other vehicles, whereby the system may be operable to control the equipped vehicle to park the vehicle after the driver has gotten out of the equipped vehicle.

In another embodiment, shown in FIG. 12, the control system 14 may be programmed to scan camera images and detect a suitable target 120 (which may, for example, be a two-dimensional barcode) on the wall of a parking spot shown at 122. The driver may then leave the vehicle 10 and the vehicle 10 may be programmed to drive itself into the parking spot 122. By having the driver leave the vehicle before it drives into the spot, the vehicle 10 can be parked closer to adjacent vehicles 124 than would otherwise be possible if the driver had to get out of the vehicle 10 after it was parked in the spot, so that more parking spots can be provided in a given area. Upon receiving a signal from a key fob for example, the vehicle 10 can back itself out of the parking spot 122 to permit the driver to open the vehicle door to get into the vehicle 10.

Figure 13:
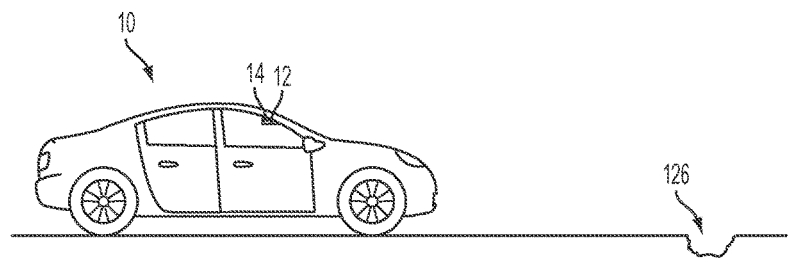
FIG. 13 is a side elevation of a vehicle equipped with a vision system in accordance with the present invention, shown with the vehicle approaching a pothole, whereby the system may control an accessory or function of the vehicle responsive to detection of a pothole ahead of the vehicle.

In another embodiment, shown in FIG. 13, the control system 14 may detect the presence of potholes 126 or the like in front of the vehicle 10. Upon such detection the control system 14 may be programmed to any one or more actions, such as, for example, automatically notify the driver, initiate braking of the vehicle 10, or even initiate a corrective steering or throttle input. Optionally, the control system 14 may change the suspension settings if the vehicle 10 has an adjustable suspension (for example, magneto rheological shock absorbers or the like).

Figure 14:
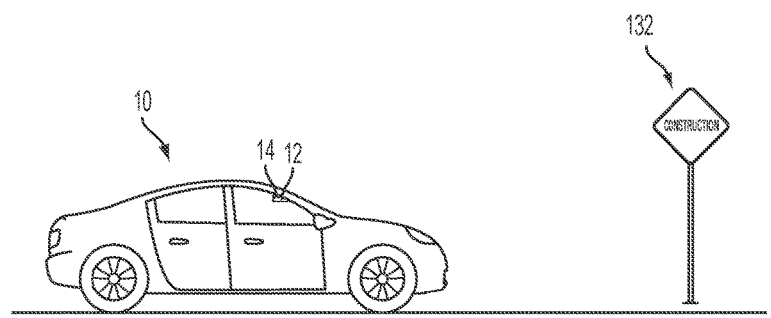
FIG. 14 is a side elevation of a vehicle equipped with a vision system in accordance with the present invention, shown with the vehicle approaching a construction zone.

In another embodiment shown in FIG. 14, the control system 14 may be programmed to detect the presence of a construction zone, shown at 130 (for example, by detecting traffic signs 132 that indicate such a zone in the camera images). Upon such detection, the control system 14 may be programmed to take actions to inhibit the driver from breathing dust or the like that can be present in the air in construction zones. Such actions may include automatically closing the vehicle windows and switching the HVAC system to a recirculation or "Recirc" mode.

Figure 15:
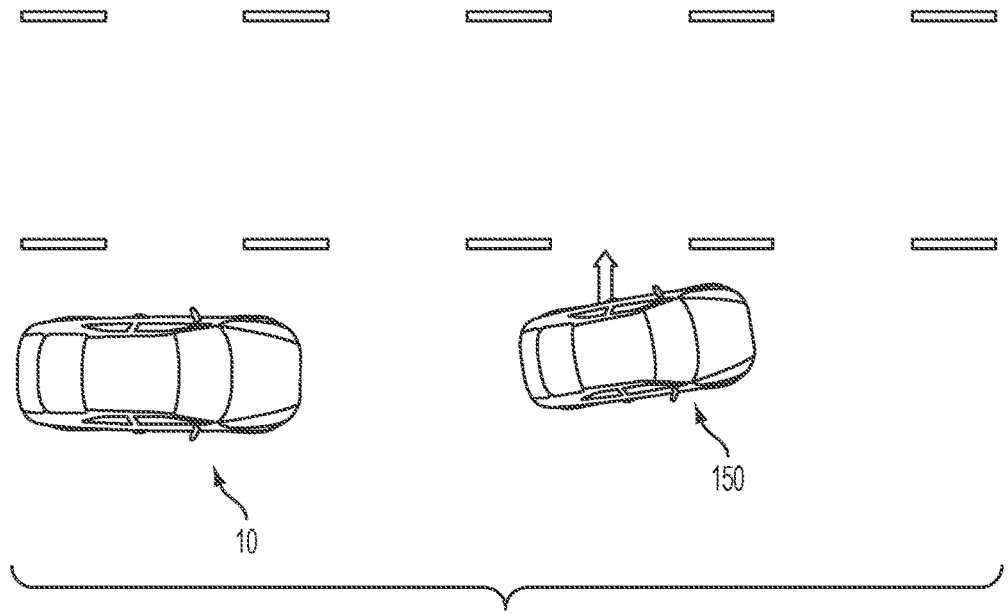
FIG. 15 is a plan view of a vehicle equipped with a vision system in accordance with the present invention, where the system may be operable to detect erratic driving behavior of the driver of a vehicle on the road ahead of the equipped vehicle.

Referring to FIG. 15, in another embodiment the control system 14 may be programmed to detect erratic driving in a nearby vehicle shown at 150. The control system 14 may, for example, detect whether the lateral acceleration of the vehicle ahead 150 exceeds a selected value. If it does, then the control system 14 may be programmed to carry out a selected action, such as to initiate braking, change suspension settings, or to carry out an evasive maneuver or the like. Such erratic driving behavior in the vehicle ahead 150 may be interpreted to be an erratic driver in the vehicle ahead, or it may be interpreted to be an evasive maneuver being carried out by the driver of the vehicle ahead to avoid an obstacle in front of that vehicle. In either case it is beneficial to carry out an action such as braking and/or change suspension settings.

Figure 16:
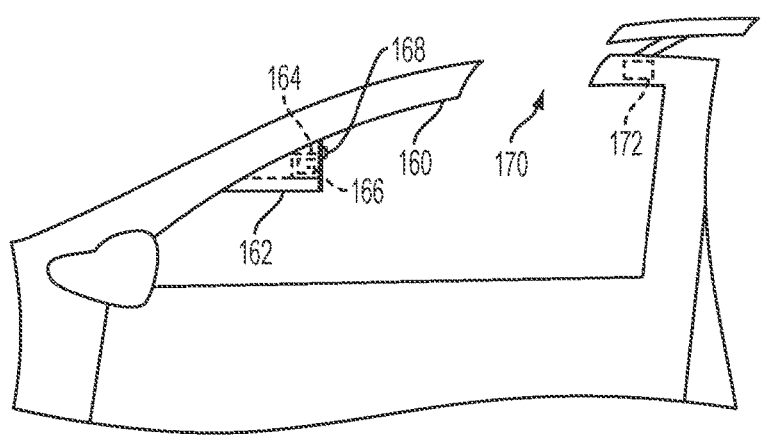
FIG. 16 is a side elevation of a portion of a vehicle equipped with a vision system in accordance with the present invention, shown with a sunroof that may be controlled via circuitry common with the vision system.

In another embodiment shown in FIG. 16, the presence of the front-facing camera 12 in the vehicle 10 near the headliner shown at 160 may be used to advantage to eliminate some other components that would otherwise be needed. For example, the camera 12 may include a housing 162 with a printed circuit board 164 and microprocessor 166 therein that may have some capability to take on additional functionality other than control of the camera 12. The printed circuit board 164 and the microprocessor 166 may make up part of the control system 14. To take advantage of this, controls (such as, for example, buttons 168) for the control of the vehicle's sunroof or moon roof shown at 170 may be provided on the camera housing 162 such that the camera's microprocessor 166 receives signals from the buttons 168 when they are pressed and so the camera's microprocessor 166 can be connected to directly control the motor system shown at 172 that drive the operation of the sunroof or moon roof 170. This eliminates the need for a separate housing, PCB and microprocessor dedicated to control of the sunroof/moon roof, thereby saving a significant amount of cost.

Figure 17:
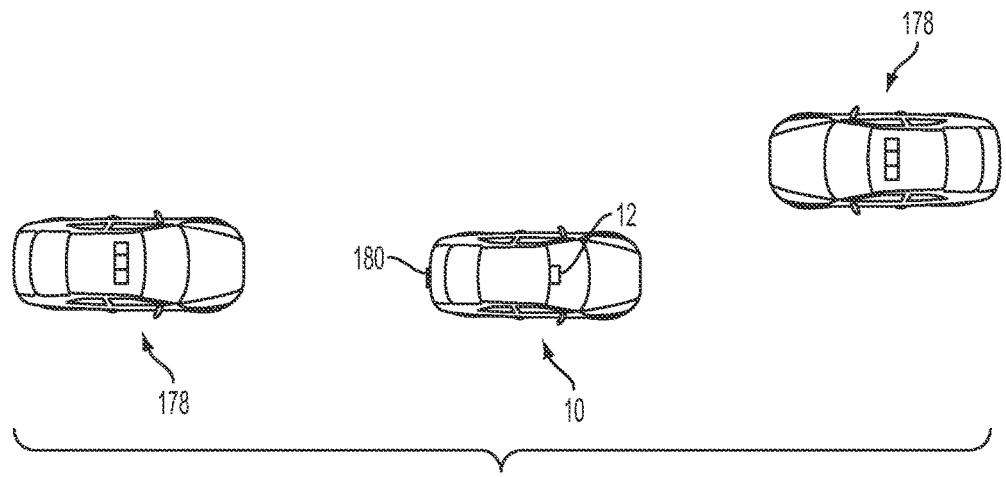
FIG. 17 is a plan view of a vehicle equipped with a vision system in accordance with the present invention, which may be operable to detect the presence of emergency vehicles on the road ahead or behind the equipped vehicle.

In another embodiment shown in FIG. 17, the control system 14 may be capable of detecting the presence of emergency vehicles shown at 178 in the camera images. Upon such detection, the control system 14 may be programmed to carry out a suitable action, such as to mute the vehicle's stereo system so that the driver can hear if there is a siren or multiple sirens so that he or she can pull the vehicle 10 over to let any emergency vehicles pass. While this may be applicable to the front-facing camera 12, this may be particularly applicable to the rear-facing camera shown at 180 of the vehicle 10.

Figure 18:
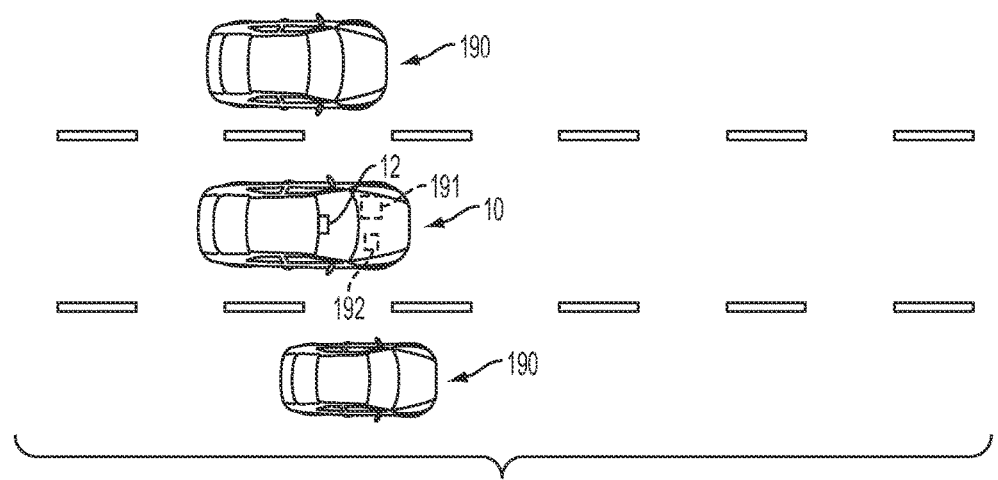
FIG. 18 is a plan view of a vehicle equipped with a vision system in accordance with the present invention, which may be operable to detect the presence of vehicles in adjacent lanes of traffic.

In another embodiment shown in FIG. 18, the control system 14 may be configured to detect the presence of vehicles 190 in adjacent lanes of traffic. Upon such detection, the control system 14 may be programmed to adjust the sensitivity of certain vehicle systems, such as for example, a lane-departure warning system shown at 191 or a lane-keeping system (such as a system for keeping the vehicle 10 centered in its lane and/or alerting the driver of the vehicle if the system detects that the vehicle is leaving its lane or the like).

In yet another embodiment, the control system 14 may use the detection of vehicles 190 in adjacent traffic lanes to adjust the programming of the forward collision warning or automated braking system (shown at 192), for example to prevent the system 192 from carrying out evasive maneuvers that would have brought the vehicle 10 into an adjacent lane of traffic.

In many instances above, the embodiments of the invention were described in relation to a front facing camera for the vehicle 10. In many embodiments however, the camera need not be a front-facing camera, and instead or additionally the camera may be a side-facing camera that is mounted to a side mirror. Such a side-facing camera, if it faces at least partially downwardly, may be particularly suited to read two-dimensional barcodes that may be provided on the floor of a parking garage, for example.

Each of the above concepts has been described separately and has been shown in separate drawings, however it will be noted that it is contemplated that a plurality of these concepts, or even all of the concepts, described herein may be provided in one vehicle as part of a common vision system or the like.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012 and published Feb. 7, 2013 as International Publication No. WO 2013/019707, and/or PCT Application No. PCT/US2012/048110, filed Jul. 25, 2012 and published Jan. 31, 2013 as International Publication No. WO 2013/016409, and/or PCT Application No. PCT/CA2012/000378, filed Apr. 25, 2012 and published Nov. 1, 2012 as International Publication No. WO 2012/145822, and/or PCT Application No. PCT/US2012/056014, filed Sep. 19, 2012 and published Mar. 28, 2013 as International Publication No. WO 2013/043661, and/or PCT Application No. PCT/US12/57007, filed Sep. 25, 2012 and published Apr. 4, 2013 as International Publication No. WO 2013/048994, and/or PCT Application No. PCT/US2012/061548, filed Oct. 24, 2012 and published May 2, 2013 as International Publication No. WO 2013/063014, and/or PCT Application No. PCT/US2012/062906, filed Nov. 1, 2012 and published May 10, 2013 as International Publication No. WO 2013/067083, and/or PCT Application No. PCT/US2012/063520, filed Nov. 5, 2012 and published May 16, 2013 as International Publication No. WO 2013/070539, and/or PCT Application No. PCT/US2012/064980, filed Nov. 14, 2012 and published May 23, 2013 as International Publication No. WO 2013/074604, and/or U.S. patent application Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. US-2013-0002873, and/or U.S. provisional applications, Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/650,667, filed May 23, 2012; Ser. No. 61/605,409, filed Mar. 1, 2012; Ser. No. 61/579,682, filed Dec. 23, 2011; Ser. No. 61/565,713, filed Dec. 1, 2011; and/or Ser. No. 61/563,965, filed Nov. 28, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149, and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012/075250, and/or PCT Application No. PCT/CA2012/000378, filed Apr. 25, 2012 and published Nov. 1, 2012 as International Publication No. WO 2012/145822, and/or U.S. patent application Ser. No. 13/333,337, filed Dec. 21, 2011 and published Jun. 28, 2012 as U.S. Publication No. US-2012-0162427, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; and/or Ser. No. 61/568,791, filed Dec. 9, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008, and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A vision system for a vehicle, said vision system comprising:
   a camera disposed at a vehicle equipped with said vision system, wherein said camera has a field of view at least forward of the equipped vehicle;
   a control comprising an image processor for processing image data captured by said camera;
   wherein, via processing by said image processor of image data captured by said camera, said control determines position of the sun relative to a driver's forward view through a windshield of the equipped vehicle;
   wherein, responsive to determining, via processing by said image processor of image data captured by said camera, that the position of the sun is likely to hinder the driver's forward view through the windshield, said control controls a sun visor of the equipped vehicle to limit sunlight from reaching the driver's eyes; and
   wherein said control determines that the position of the sun is likely to hinder the driver's forward view through the windshield at least in part responsive to detection of light in a range of colors that is indicative of sunlight from the sun.

2. The vision system of claim 1, wherein said control determines that the position of the sun is likely to hinder the driver's forward view through the windshield at least in part responsive to an intensity of ambient light at the equipped vehicle.

3. The vision system of claim 1, wherein said control determines that the position of the sun is likely to hinder the driver's forward view through the windshield at least in part responsive to an angle of the position of the sun relative to ground and relative to direction of travel of the equipped vehicle.

4. The vision system of claim 1, wherein said control determines that the position of the sun is likely to hinder the driver's forward view through the windshield at least in part responsive to detection of a brightness level above a threshold level that is indicative of sunlight from the sun.

5. The vision system of claim 1, wherein said camera is disposed at a windshield of the equipped vehicle and views forward through the windshield and ahead of the equipped vehicle.

6. The vision system of claim 1, wherein said sun visor comprises an adjustable sun visor that is adjustable between a stowed orientation, where said sun visor is disposed along a headliner of the equipped vehicle, and a use orientation, where said sun visor is disposed at least partially in the driver's forward view through the windshield of the equipped vehicle.

7. The vision system of claim 6, wherein said sun visor is adjusted via an actuator that moves said sun visor between the stowed and use orientations.

8. The vision system of claim 7, wherein said actuator pivots said sun visor between the stowed and use orientations.

9. The vision system of claim 7, wherein said control moves said sun visor toward the use orientation responsive to determining, via processing by said image processor of image data captured by said camera, that the position of the sun is likely to hinder the driver's forward view through the windshield of the equipped vehicle.

10. The vision system of claim 6, wherein, with said sun visor in the use orientation, and responsive to determining, via processing by said image processor of image data captured by said camera, that the position of the sun is no longer likely to hinder the driver's forward view through the windshield, said control moves said sun visor toward the stowed orientation.

11. The vision system of claim 1, wherein said sun visor comprises a variable light transmissive portion of the windshield of the equipped vehicle, and wherein said control adjusts the variable light transmissive portion of the windshield to a darkened state that attenuates light transmission therethrough responsive to determining, via processing by said image processor of image data captured by said camera, that the position of the sun is likely to hinder the driver's forward view through the windshield.

12. The vision system of claim 11, wherein, with the variable light transmissive portion of the windshield being in the darkened state, and responsive to determining, via processing by said image processor of image data captured by said camera, that the position of the sun is no longer likely to hinder the driver's forward view through the windshield, said control adjusts the variable light transmissive portion of the windshield to a non-darkened state.

13. The vision system of claim 12, wherein the variable light transmissive portion of the windshield comprises an electro-optic windshield portion.

14. A vision system for a vehicle, said vision system comprising:
  a camera disposed at a vehicle equipped with said vision system, wherein said camera has a field of view at least forward of the equipped vehicle;
  a control comprising an image processor for processing image data captured by said camera;
  wherein, via processing by said image processor of image data captured by said camera, said control determines position of the sun relative to a driver's forward view through a windshield of the equipped vehicle;
  wherein, responsive to determining, via processing by said image processor of image data captured by said camera, that the position of the sun is likely to hinder the driver's forward view through the windshield, said control controls a sun visor of the equipped vehicle to limit sunlight from reaching the driver's eyes; and
  wherein said control determines that the position of the sun is likely to hinder the driver's forward view through the windshield at least in part responsive to (i) an intensity of ambient light at the equipped vehicle and (ii) detection, via processing by said image processor of image data captured by said camera, of a brightness level above a threshold level that is indicative of sunlight from the sun.

15. The vision system of claim 14, wherein said control determines that the position of the sun is likely to hinder the driver's forward view through the windshield at least in part responsive to an angle of the position of the sun relative to ground and relative to direction of travel of the equipped vehicle.

16. The vision system of claim 14, wherein said control determines that the position of the sun is likely to hinder the driver's forward view through the windshield at least in part responsive to detection of light in a range of colors that is indicative of sunlight from the sun.

17. A vision system for a vehicle, said vision system comprising:
  a camera disposed at a vehicle equipped with said vision system, wherein said camera has a field of view at least forward of the equipped vehicle;
  wherein said camera is disposed at a windshield of the equipped vehicle and views forward through the windshield and ahead of the equipped vehicle;
  a control comprising an image processor for processing image data captured by said camera;
  wherein, via processing by said image processor of image data captured by said camera, said control determines position of the sun relative to a driver's forward view through the windshield;
  wherein, responsive to determining, via processing by said image processor of image data captured by said camera, that the position of the sun is likely to hinder the driver's forward view through the windshield, said control controls a sun visor of the equipped vehicle to limit sunlight from reaching the driver's eyes;
  wherein said control determines that the position of the sun is likely to hinder the driver's forward view through the windshield at least in part responsive to detection of light in a range of colors that is indicative of sunlight from the sun; and
  wherein said sun visor comprises one of (i) an adjustable sun visor that is adjustable between a stowed orientation, where said sun visor is disposed along a headliner of the equipped vehicle, and a use orientation, where said sun visor is disposed at least partially in the driver's forward view through the windshield of the equipped vehicle, and (ii) a variable light transmissive portion of the windshield of the equipped vehicle that is adjustable between a transmissive state, where the variable light transmissive portion of the windshield is transmissive to visible light, and a darkened state, where the variable light transmissive portion of the windshield attenuates transmission of visible light more than when in the transmissive state.

18. The vision system of claim 17, wherein said control determines that the position of the sun is likely to hinder the driver's forward view through the windshield at least in part responsive to an intensity of ambient light at the equipped vehicle.

19. The vision system of claim 17, wherein said control determines that the position of the sun is likely to hinder the driver's forward view through the windshield at least in part responsive to an angle of the position of the sun relative to ground and relative to direction of travel of the equipped vehicle.

\* \* \* \* \*